US012700707B2

(12) United States Patent
Kitahara

(10) Patent No.: US 12,700,707 B2
(45) Date of Patent: Aug. 4, 2026

(54) OPTICAL FIBER AND FIBER LASER DEVICE

(71) Applicant: Fujikura Ltd., Tokyo (JP)

(72) Inventor: Rintaro Kitahara, Sakura (JP)

(73) Assignee: Fujikura Ltd., Tokyo (JP)

( * ) Notice: Subject to any disclaimer, the term of this patent is extended or adjusted under 35 U.S.C. 154(b) by 795 days.

(21) Appl. No.: 17/798,498

(22) PCT Filed: Dec. 24, 2020

(86) PCT No.: PCT/JP2020/048469
§ 371 (c)(1),
(2) Date: Aug. 9, 2022

(87) PCT Pub. No.: WO2021/205697
PCT Pub. Date: Oct. 14, 2021

(65) Prior Publication Data
US 2023/0088741 A1     Mar. 23, 2023

(30) Foreign Application Priority Data

Apr. 8, 2020     (JP) ................................. 2020-069933

(51) Int. Cl.
*H01S 3/067*          (2006.01)
*G02B 6/02*           (2006.01)
(Continued)

(52) U.S. Cl.
CPC ...... *H01S 3/06708* (2013.01); *G02B 6/02009* (2013.01); *H01S 3/0675* (2013.01); *H01S 3/094003* (2013.01); *H01S 3/09415* (2013.01)

(58) Field of Classification Search
None
See application file for complete search history.

(56) References Cited

U.S. PATENT DOCUMENTS

| | | | |
|---|---|---|---|
| 7,570,856 B1 * | 8/2009 | Minelly .............. | H01S 3/06716 385/127 |
| 8,761,211 B2 * | 6/2014 | Fermann ............. | H01S 3/08054 359/345 |

(Continued)

FOREIGN PATENT DOCUMENTS

| | | |
|---|---|---|
| CN | 103890623 A | 6/2014 |
| EP | 2053710 A2 | 4/2009 |

(Continued)

OTHER PUBLICATIONS

Ming-Jun Li et al., "Limit of Effective Area for Single-Mode Operation in Step-Index Large Mode Area Laser Fibers", Journal of Lightwave Technology, Jul. 22, 2009, vol. 27, No. 15, p. 3010-3016 (7 pages).

(Continued)

*Primary Examiner* — Tod T Van Roy
(74) *Attorney, Agent, or Firm* — Osha Bergman Watanabe & Burton LLP

(57) ABSTRACT
An optical fiber includes a core and a cladding. An effective area $A_{eff}$ of light of a fundamental mode, having a wavelength of 1070 nm and propagating through the core, is 500 µm$^2$ or more. A numerical aperture NA of the core satisfies the following formula:

$$NA \geq \left(1.3 \times 10^{-11} \times a^4 / b^6\right)^{1/6}$$

where a (m) is a radius of the core and b (m) is a radius of the cladding. A V value, that is a waveguide parameter of the optical fiber, satisfies the following formula:

$$V \leq 1.3583 \times b^{-0.2555}.$$

7 Claims, 7 Drawing Sheets

(51) Int. Cl.

| | |
|---|---|
| *H01S 3/094* | (2006.01) |
| *H01S 3/0941* | (2006.01) |

(56) References Cited

U.S. PATENT DOCUMENTS

| | | | | |
|---|---|---|---|---|
| 8,873,134 | B2 | 10/2014 | Price et al. | |
| 10,007,055 | B2 * | 6/2018 | Sillard | H04J 14/05 |
| 2003/0202547 | A1 * | 10/2003 | Fermann | H01S 3/1608 |
| | | | | 372/18 |
| 2009/0316733 | A1 * | 12/2009 | Yao | H01S 3/0675 |
| | | | | 372/6 |
| 2010/0195194 | A1 * | 8/2010 | Chen | G02B 6/03644 |
| | | | | 385/127 |
| 2015/0372442 | A1 * | 12/2015 | Dong | H01S 3/06708 |
| | | | | 372/6 |
| 2019/0310416 | A1 * | 10/2019 | Kishi | H01S 3/1618 |
| 2021/0066879 | A1 * | 3/2021 | Kitahara | G02B 6/02047 |
| 2021/0257799 | A1 * | 8/2021 | Pauzauskie | H01S 3/0408 |
| 2022/0271494 | A1 * | 8/2022 | Hosokawa | H01S 3/06729 |
| 2023/0088741 | A1 * | 3/2023 | Kitahara | H01S 3/06704 |
| | | | | 372/6 |

FOREIGN PATENT DOCUMENTS

| | | | | |
|---|---|---|---|---|
| EP | 3 993 182 A1 | 5/2022 | | |
| JP | 2007-518566 A | 7/2007 | | |
| JP | 2013254829 A * | 12/2013 | | |
| JP | 2014-511125 A | 5/2014 | | |
| WO | 2016/167080 A1 | 10/2016 | | |
| WO | 2019/131971 A1 | 7/2019 | | |
| WO | WO-2019131970 A1 * | 7/2019 | ......... G02B 6/02019 | |

OTHER PUBLICATIONS

Vincent Petit et al., "Extremely low NA Yb doped preforms (<0.03) fabricated by MCVD", SPIE LASE, San Francisco, CA, 2016, vol. 9728, p. 97282R-1 (7 pages).

Robert Olshansky, "Distortion Losses in Cabled Optical Fibers", Applied Optics, Jan. 1975, vol. 14, No. 1, pp. 20-21 (2 pages).

Ross T. Schermer, "Mode scalability in bent optical fibers", Optics Express, Nov. 2007, vol. 15, No. 24, pp. 15674-15701 (28 pages).

* cited by examiner

OPTICAL FIBER AND FIBER LASER DEVICE

TECHNICAL FIELD

The present invention relates to an optical fiber and a fiber laser device.

BACKGROUND

A fiber laser device is excellent in light condensing property, has high power density, and can obtain light that becomes a small beam spot. Therefore, in recent years, it has been used in various fields such as a laser processing field and a medical field, and accordingly, it has been demanded to increase the output of emitted light. However, when the output is increased as described above, the power density of light propagating through the core of an optical fiber increases, and thus stimulated Raman scattering is likely to occur. When stimulated Raman scattering occurs and a wavelength of the light propagating through the core is converted, this can cause a decrease in performance of the fiber laser device. Therefore, in the fiber laser device, it is required to suppress the occurrence of stimulated Raman scattering.

Examples of a means for suppressing occurrence of stimulated Raman scattering include increasing an effective area $A_{eff}$ of the light propagating through the core and reducing the energy density of light. Examples of the means for increasing the effective area $A_{eff}$ include increasing the diameter of the core and reducing the numerical aperture NA of the core. However, when the diameter of the core is increased, the number of modes of the light propagating through the core tends to increase. In addition, in a case where the diameter of the core is increased and the numerical aperture NA of the core is reduced without changing the diameter of a cladding, leakage of the light propagating through the core into the cladding becomes large, and the thickness of the cladding becomes relatively thin, so that mode coupling due to disturbance can easily occur. As described above, when the effective area $A_{eff}$ of the light propagating through the core is increased, the number of modes of the light propagating through the core is increased, and beam quality of the fiber laser device can be deteriorated. Note that the beam quality is expressed by, for example, $M^2$ (M square), and the beam quality is better as the value of $M^2$ is closer to 1.

As described above, in the case of increasing the output of the fiber laser device, it is required to optimally design the core diameter and the cladding diameter of the optical fiber, the numerical aperture NA of the core, and the like in order to suppress the occurrence of stimulated Raman scattering and deterioration of the beam quality.

Non Patent Literature 1 described below describes that the value of $M^2$ of light emitted from a fiber laser device manufactured using an optical fiber designed so that the diameter of the core is 52 μm, the diameter of the cladding is 750 μm, the numerical aperture NA of the core is 0.025, and the effective area $A_{eff}$ is 1000 μm is 1.04.

[Non Patent Literature 1] V. Petit, R. P. Tumminelli, J. D. Minelly, and V. Khitrov, "Extremely low NA Yb doped preforms (<0.03) fabricated by MCVD," presented at the SPIE LASE, San Francisco, California, United States, 2016, p. 97282R.

SUMMARY

However, in the optical fiber of Non Patent Literature 1 described above, the bending diameter of the optical fiber needs to be 600 mm or more in order to propagate light of a fundamental mode. Thus, for example, when a fiber laser device is configured using the optical fiber of Non Patent Literature 1, the fiber laser device is increased in size, which can be disadvantageous in terms of incorporation into a processing device and the like.

Hence, one or more embodiments provide an optical fiber capable of suppressing deterioration of beam quality and occurrence of stimulated Raman scattering and allowing bending with a large curvature, and a fiber laser device including the optical fiber.

An optical fiber, according to one or more embodiments, includes a core and a cladding, in which an effective area $A_{eff}$ of light of a fundamental mode having a wavelength of 1070 nm propagating through the core is 500 μm$^2$ or more, and when a radius of the core is a(m) and a radius of the cladding is b(m), a numerical aperture NA of the core satisfies the formula described below $$NA \geq \left(1.3 \times 10^{-11} \times a^4 / b^6\right)^{1/6},$$

and
a V value that is a waveguide parameter of the optical fiber satisfies the formula described below $$V \leq 1.3583 \times b^{-0.255}.$$

In a case where the light propagating through the core of the optical fiber is only the light of the fundamental mode, the value of $M^2$ is 1, and the value of $M^2$ increases as the number of modes of the light when propagating through the optical fiber increases. Therefore, deterioration of the beam quality to be measured can be expressed by a difference $\Delta M^2$ between the value of $M^2$ of light incident on the optical fiber and the value of $M^2$ of light emitted from the optical fiber, and it means that the larger the value of $\Delta M^2$ the worse the beam quality.

In a general fiber laser device, the length of an optical fiber in a portion where light generated in a resonator is guided is approximately 40 m or less. The light oscillated in the resonator and emitted from the fiber laser device includes light that reciprocates in the portion where the light generated in the resonator is guided. Therefore, the value of $M^2$ of the light emitted from the fiber laser device tends to be larger than the value of $M^2$ in a case where the light propagates only 40 m one way and is emitted without reciprocating in the aforementioned portion. However, when the value of $\Delta M^2$ of the light propagated one way is 0.1 or less, the value of $M^2$ of the light emitted from the fiber laser device can be approximately 1.5. When the value of $M^2$ is approximately 1.5, performance required in a normal fiber laser device can be satisfied.

When a wavelength of light propagating through the core is 1070 nm and the numerical aperture NA of the core satisfies the formula described above, the value of $\Delta M^2$ per unit length 1 m of the optical fiber can be 0.0025 or less. As described above, in the general fiber laser device, since the one-way length of the portion where the light generated in the resonator is guided is approximately 40 m or less, when the numerical aperture NA satisfies the above formula, the value of $\Delta M^2$ of the light propagating over the one-way described above can be 0.1 or less. Thus, deterioration of the beam quality can be suppressed to such an extent that the value of $M^2$ of the light emitted from the fiber laser device does not exceed 1.5.

Incidentally, in a fiber laser device, generally, there is a fusion-spliced portion between optical fibers, such as a fusion-spliced portion between an amplification optical fiber and a delivery fiber. In such a fusion-spliced portion, even when there is no axial deviation or angular deviation between the optical fibers, the light of the fundamental mode tends to be coupled to an axisymmetric higher-order mode such as the LP03 mode. Therefore, in the fiber laser device, there is a demand for bending the optical fiber with a predetermined bending radius to remove an axisymmetric higher-order mode. In addition, in the fiber laser device, generally, for the reason of reducing the probability of breakage of the optical fiber or the like, the percentage of the radius of the cladding to the bending radius of the optical fiber may be 2% or less.

In a case where a wavelength of light propagating through the core is 1070 nm, when the optical fiber is bent at a bending radius at which the percentage of the radius of the cladding to the bending radius of the optical fiber is 1% or less, when the V value that is the waveguide parameter of the optical fiber satisfies the formula described above, light of LP03 mode can be cut off. Therefore, with the optical fiber described above formed so that the V value satisfies the formula described above, the light of LP03 mode can be cut off, and the deterioration of the beam quality can be suppressed.

In addition, in a fiber laser device that emits light having a wavelength of 1070 nm, generally, when the effective area $A_{eff}$ of light of the fundamental mode having a wavelength of 1070 nm is 500 μm² or more, stimulated Raman scattering tends to be less likely to occur. As described above, in the optical fiber described above, since the effective area $A_{eff}$ of the light of the fundamental mode having a wavelength of 1070 nm propagating through the core is 500 μm² or more, the occurrence of stimulated Raman scattering can be suppressed.

Incidentally, when the optical fiber having a cladding radius of 325 μm disclosed in Non Patent Literature 1 described above is bent at a bending diameter of 350 mm in which the percentage of the cladding radius to the bending radius of the optical fiber is 0.09%, the light of LP01 mode is lost as much as about 10 dB/m, and thus such bending of the optical fiber is not allowed. The optical fiber, according to one or more embodiments, was bent under the same conditions as those described in Non Patent Literature 1, and the loss of the light of LP01 mode propagating through the core of the optical fiber was studied. As a result, the loss of the light of LP01 mode propagating through the optical fiber was approximately 0.001 dB/m. The loss of the light of 0.001 dB/m is extremely small as compared with the loss of the light of 10 dB/m in the optical fiber of Non Patent Literature 1. Therefore, with the optical fiber according to one or more embodiments, the aforementioned bending that is not allowed in Non Patent Literature 1 is allowed.

As described above, with the optical fiber, it is possible to suppress deterioration of beam quality and occurrence of stimulated Raman scattering and allow bending with a large curvature.

Further, the effective area $A_{eff}$ may be 600 μm² or more.

In this case, stimulated Raman scattering can be suppressed as compared with a case where the effective area $A_{eff}$ is 500 μm² or more and less than 600 μm².

In addition, the effective area $A_{eff}$ may be 800 μm² or more.

In this case, stimulated Raman scattering can be suppressed as compared with a case where the effective area $A_{eff}$ is 600 μm² or more and less than 800 μm².

The V value may satisfy the formula described below.

$$V \leqq 1.6509 \times b^{-0.1992}$$

When this formula is satisfied, the light of LP02 mode can be cut off in addition to the light of LP03 mode by bending the optical fiber with the bending radius in which the percentage described above is 1% or less, and the beam quality can be further improved.

The numerical aperture NA may be 0.05 or more.

In this case, mode coupling due to disturbance can be suppressed as compared with a case where the numerical aperture NA is smaller than 0.05.

According to one or more embodiments, the fiber laser device includes the optical fiber according to any of the above.

The fiber laser device includes the optical fiber according to any of the above. Thus, with the fiber laser device, it is possible to suppress deterioration of beam quality and occurrence of stimulated Raman scattering and allow bending of the optical fiber with a large curvature. In addition, since the fiber laser device can be constituted by bending the optical fiber with a large curvature, it is possible to suppress an increase in size of the fiber laser device.

As described above, according to one or more embodiments, an optical fiber capable of suppressing deterioration of beam quality and occurrence of stimulated Raman scattering and allowing bending with a large curvature, and a fiber laser device including the optical fiber can be provided.

DETAILED DESCRIPTION

One or more embodiments of the optical fiber and the fiber laser device will be illustrated below together with the accompanying drawings. One or more embodiments illustrated below are for facilitating the understanding of the invention, and are not for limiting the interpretation of the invention. The embodiments can be changed or modified without departing from the spirit. In addition, in the specification, the dimensions of each member may be exaggerated for ease of understanding.

Figure 1:
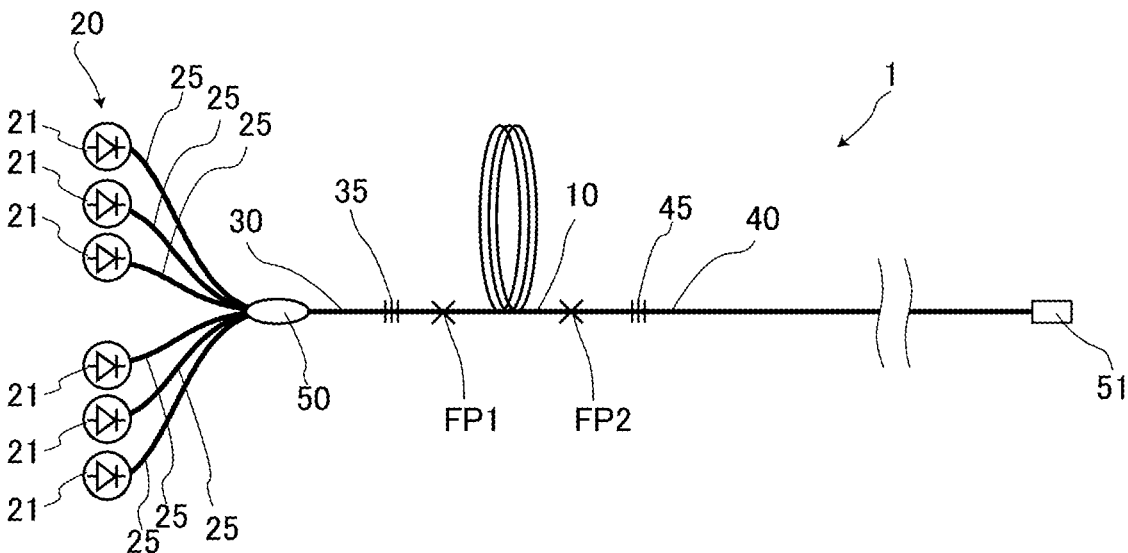
FIG. 1 is a diagram schematically illustrating a fiber laser device according to one or more embodiments.

FIG. 1 is a diagram illustrating a fiber laser device according to one or more embodiments. As illustrated in FIG. 1, a fiber laser device 1 of one or more embodiments includes, as main configurations, an amplification optical fiber 10, a pumping light source 20, an optical fiber 30, a first FBG 35 provided in the optical fiber 30, a delivery fiber 40, a second FBG 45 provided in the delivery fiber 40, and an optical combiner 50. In addition, an output end 51 is connected to an end portion of the delivery fiber 40 on a side opposite to the second FBG side.

In the fiber laser device 1 of one or more embodiments, the length from the first FBG 35 to the output end 51 is 40 m or less.

The amplification optical fiber 10 is fusion-spliced to the optical fiber 30 at a fusion-spliced portion FP1, and is fusion-spliced to the delivery fiber 40 at a fusion-spliced portion FP2.

Figure 2:
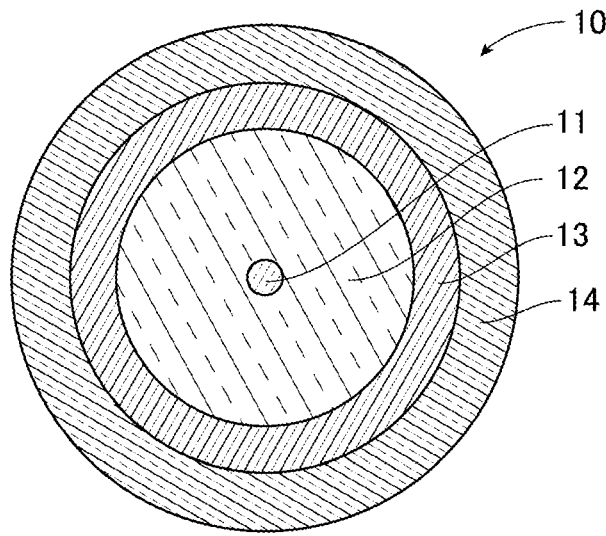
FIG. 2 is a diagram illustrating a state of a cross section perpendicular to a longitudinal direction of an amplification optical fiber.

FIG. 2 is a diagram illustrating a state of a cross section of such amplification optical fiber 10. As illustrated in FIG. 2, the amplification optical fiber 10 has a so-called double cladding structure and includes, as main configurations, a core 11, an inner cladding 12 surrounding the outer peripheral surface of the core 11 without a gap, an outer cladding 13 covering the outer peripheral surface of the inner cladding 12, and a cover layer 14 covering the outer cladding 13. The refractive index of the inner cladding 12 is lower than the refractive index of the core 11, and the refractive index of the outer cladding 13 is lower than the refractive index of the inner cladding 12.

Note that, in the specification, for example, mere indication of cladding of an optical fiber including an inner cladding and an outer cladding such as an amplification optical fiber means the inner cladding unless otherwise specified.

In one or more embodiments, the core 11 includes, for example, quartz to which ytterbium (Yb) to be pumped by pumping light emitted from the pumping light source 20 is added as an active element in an amount of about 1 wt %. In addition, the inner cladding 12 includes, for example, pure quartz to which no dopant is added. With such a configuration, in one or more embodiments, a relative refractive index difference Δ between a refractive index n1 of the core 11 and a refractive index n2 of the cladding 12 is about 0.06% or more and about 0.15% or less. The relative refractive index difference Δ described above is expressed by Formula (1) described below.

$$\Delta = \left( n_1^2 - n_2^2 \right) / 2n_1^2 \qquad (1)$$

The numerical aperture NA of the core is expressed by Formula (2) described below.

$$NA = \left( n_1^2 - n_2^2 \right)^{1/2} \qquad (2)$$

When the radius of the core 11 is a(m) and the radius of the cladding 12 is b(m), the numerical aperture NA in one or more embodiments satisfies Formula (3) described below.

$$NA \geq \left( 1.3 \times 10^{-11} \times a^4 / b^6 \right)^{1/6} \qquad (3)$$

Note that Formula (3) will be described in detail below.

In one or more embodiments, light propagating through the core 11 includes light having a wavelength of 1070 nm due to the configuration of the first FBG 35 and the second FBG 45 to be described below, and at least light of LP01 mode, which is the fundamental mode, propagates through the core 11. Note that, in a case where the light propagating through the core 11 is only the light of LP01 mode, the value of $M^2$ representing the beam quality of the light is 1, and the value of $M^2$ increases as the number of modes of the light propagating through the core 11 increases. Thus, the larger the value of a difference $\Delta M^2$ between the value of $M^2$ of light incident on the optical fiber and the value of $M^2$ of light emitted from the optical fiber, it means that the worse the beam quality of the light emitted from the optical fiber.

The outer cladding 13 includes resin or quartz, examples of the resin include a thermosetting resin and an ultraviolet curable resin, and examples of the quartz include quartz to which a dopant such as fluorine (F) that reduces the refractive index is added so as to have a refractive index lower than that of the inner cladding 12. In addition, examples of the material constituting the cover layer 14 include a thermosetting resin and an ultraviolet curable resin, and when the outer cladding 13 is resin, the cover layer 14 may be a thermosetting resin or an ultraviolet curable resin different from the resin constituting the outer cladding 13.

The amplification optical fiber 10 includes a bent portion that is bent with a predetermined bending radius R(m). In one or more embodiments, the percentage of the radius b(m) of the cladding 12 to the bending radius R of the bent portion is approximately 1%, and the bending radius R of the bent portion is approximately 100 times the radius b of the cladding 12.

Incidentally, the number of modes of light that can propagate through the core of the optical fiber can be determined by the V value defined by Formula (4) described below. The V value is called a waveguide parameter, and the larger the V value, it means that the larger the number of modes of the light that can propagate through the core. The V value tends to decrease as the curvature of the bent portion of the optical fiber increases.

$$V = (2\pi a NA)/\lambda \tag{4}$$

Note that, in Formula (4), A represents a wavelength of the light propagating through the core, and is 1070 nm in one or more embodiments.

In one or more embodiments, the amplification optical fiber 10 is configured such that the V value described above satisfies Formula (5) described below.

$$V \leq 1.3583 \times b^{-0.2555} \tag{5}$$

Note that Formula (5) will be described in detail below.

In addition, the amplification optical fiber 10 is configured such that the effective area $A_{eff}$ of the light of LP01 mode having a wavelength of 1070 nm is 500 μm or more.

As illustrated in FIG. 1, the pumping light source 20 includes a plurality of laser diodes 21 and optical fibers 25 connected to the respective laser diodes 21. Each laser diode 21 emits light having, for example, a wavelength band of 900 nm. The optical fiber 25 has a so-called single cladding structure, and includes a core, a cladding surrounding the outer peripheral surface of the core without a gap and having a refractive index lower than that of the core, and a cover covering the cladding. Each of the optical fibers 25 is optically connected to one end of the optical fiber 30 via the optical combiner 50.

The optical fiber 30 has a double cladding structure similarly to the amplification optical fiber 10. The core of the optical fiber 30 includes, for example, quartz into which an element such as germanium (Ge) that increases the refractive index has been added. In addition, the inner cladding includes, for example, pure quartz to which no dopant is added. In addition, the outer cladding includes resin or quartz. Examples of the resin forming the outer cladding include a thermosetting resin or an ultraviolet curable resin. Examples of the quartz forming the outer cladding include quartz to which a dopant such as fluorine (F) that reduces the refractive index is added so as to have a refractive index lower than that of the inner cladding. The cover includes, for example, an ultraviolet curable resin or a thermosetting resin. Note that when the cover layer 14 includes resin, for example, an ultraviolet curable resin or a thermosetting resin different from the resin constituting the outer cladding is used.

A one-side end portion of the inner cladding of the optical fiber 30 is optically connected to the core of each optical fiber 25 via the optical combiner 50. On the other hand, the other-side end portion of the inner cladding of the optical fiber 30 is optically connected to the cladding 12 of the amplification optical fiber 10.

In one or more embodiments, the optical fiber 30 is configured such that the radius a of the core, the radius b of the cladding, the numerical aperture NA, and the effective area $A_{eff}$ are the same as the radius a of the core, the radius b of the cladding, the numerical aperture NA, and the area $A_{eff}$ of the amplification optical fiber 10, respectively, and is configured to satisfy Formula (3) described above.

The delivery fiber 40 has a single cladding structure, and includes a core, a cladding surrounding the outer peripheral surface of the core without a gap and having a refractive index lower than that of the core, and a cover covering the cladding. A one-side end portion of the cladding of the delivery fiber 40 is optically connected to the cladding 12 of the amplification optical fiber 10. In addition, a one-side end portion of the core of the delivery fiber 40 is optically connected to the core of the amplification optical fiber 10. On the other hand, the output end 51 including, for example, quartz is attached to the other-side end portion of the delivery fiber 40.

In one or more embodiments, the delivery fiber 40 is configured such that the radius a of the core, the radius b of the cladding, the numerical aperture NA, and the effective area $A_{eff}$ are the same as the radius a of the core, the radius b of the cladding, the numerical aperture NA, and the effective area $A_{eff}$ of the amplification optical fiber 10, respectively, and is configured to satisfy Formula (3) described above. In addition, the delivery fiber 40 includes a bent portion that is bent with substantially the same bending radius R as that of the amplification optical fiber 10, and is configured to satisfy Formula (5) described above.

The first FBG 35 is provided in the core of the optical fiber 30. The first FBG 35 is optically coupled to the core 11 of the amplification optical fiber 10, and has a configuration in which a portion where the refractive index periodically increases is repeated along the longitudinal direction of the optical fiber 30. By adjusting this period, at least light having some wavelength within the light emitted by the active element of the amplification optical fiber 10 in the pumped state is reflected. The reflectance of the first FBG 35 is higher than the reflectance of the second FBG 45 to be described below, and light having a desired wavelength within the light emitted by the active element is reflected, for example, at 99% or more. In one or more embodiments, a wavelength of the light reflected by the first FBG 35 is approximately 1070 nm.

The second FBG 45 is provided in the core of the delivery fiber 40. The second FBG 45 is optically coupled to the core 11 of the amplification optical fiber 10, and has a configuration in which a portion where the refractive index increases at a constant period is repeated along the longitudinal direction of the delivery fiber 40. The second FBG 45 reflects at least light having some wavelength within the light reflected by the first FBG 35 at a lower reflectance than the first FBG 35. In one or more embodiments, the second FBG 45 reflects the light having a wavelength of 1070 nm reflected by the first FBG 35 at a reflectance of, for example, 5% to 50%.

Next, the operation of the fiber laser device 1 of one or more embodiments will be described.

In the fiber laser device 1, first, pumping light is emitted from each laser diode 21 of the pumping light source 20. Then, the pumping light emitted from each laser diode 21 propagates through the core of the optical fiber 25 and is combined in the optical combiner 50. The combined pumping light propagates through the inner cladding of the optical fiber 30.

The pumping light described above is incident on the cladding 12 of the amplification optical fiber 10 and becomes cladding mode light. The cladding mode light mainly propagates through the cladding 12 and passes through the core 11 of the amplification optical fiber 10. In this way, a part of the cladding mode light incident on the core 11 is absorbed by ytterbium, which is an active element added to the core 11, and as a result, the active element is pumped. In this way, the cladding mode light incident on the amplification optical fiber 10 becomes pumping light, and the active element brought into a pumped state by the pumping light emits spontaneous emission light of a specific wavelength. The spontaneous emission light at this time is mainly light in a wavelength band of 1070 nm when the active element is ytterbium. The spontaneous emission light propagates through the core 11 of the amplification optical fiber 10, and mainly the light having a wavelength of 1070 nm is reflected by the first FBG 35. In addition, the light having a wavelength of 1070 nm reflected by the first FBG 35 is reflected by the second FBG 45. In this way, a resonator includes the amplification optical fiber 10, the first FBG 35, and the second FBG 45, and mainly the light having a wavelength of 1070 nm reciprocates in the resonator. Then, when the light reflected by the first FBG 35 and the second FBG 45 propagates through the core 11 of the amplification optical fiber 10, stimulated emission occurs and mainly the light having a wavelength of 1070 nm is amplified, and a laser oscillation state occurs when gain and loss in the resonator become equal. Then, a part of the light having a wavelength of 1070 nm oscillated in such a resonator passes through the second FBG 72 and propagates through the core of the delivery fiber 40 as laser light. Finally, the laser light is emitted from the output end 51 to the outside, and is emitted to, for example, a workpiece and contributes to processing of the workpiece.

The amplification optical fiber 10, the optical fiber 30, and the delivery fiber 40 of such a fiber laser device 1 are configured to satisfy Formula (3) as described above. With such a configuration, deterioration of the beam quality is suppressed to such an extent that the value of $M^2$ of the light having a wavelength of 1070 nm emitted from the fiber laser device 1 does not exceed 1.5. This point will be described below.

mode coupling of light propagating through the core of the optical fiber has been studied, and it has been found that such mode coupling tends to depend on the radius of the core, the radius of the cladding, and the numerical aperture NA of the core, and further studied to verify this point.

Non Patent Literature 2 (R. Olshansky, "Distortion Losses in Cabled Optical Fibers," Appl. Opt. 14, (1975)) describes that a loss $\gamma$ of a single mode fiber when receiving a predetermined disturbance is expressed by Formula (6) described below.

$$\gamma \propto \Delta^{-3} \times \left(a^4 / b^6\right) \times (kg \times Ee / Ef)^{3/2} \tag{6}$$

In Formula (6), kg is a constant, Ee is the Young's modulus of the cover of the optical fiber, and Ef is the Young's modulus of a glass portion including the core and the cladding of the optical fiber. Note that the relative refractive index difference $\Delta$ can be expressed by Formula (7) described below on the basis of Formulae (1) and (2) described above.

$$\Delta = NA^2 / 2n_1^2 \tag{7}$$

Here, in a case where the light having a wavelength of 1070 nm propagates through the core and the relative refractive index difference $\Delta$ is a minute value of about 0.06% or more and about 0.15% or less as described above, the refractive index $n_1$ of the core in Formula (7) may be considered to be 1.45.

Incidentally, it has been considered that in a few-mode fiber, power corresponding to the loss of the fundamental mode caused by disturbance received during propagation over a predetermined length is coupled to a higher-order mode. When the fundamental mode is coupled to the higher-order mode, the beam quality tends to deteriorate and the value of $\Delta M^2$ tends to increase. Hence, it has been considered that the loss $\gamma$ of the single mode fiber in Formula (6) described above can be expressed as a difference $\Delta M^2$ in beam quality of light in the few-mode fiber. In addition, it has been considered that in the few-mode fiber, coupling of the fundamental mode to the higher-order mode is larger as the optical fiber is longer, and $\Delta M^2$ is proportional to the length L(m) of the optical fiber. Note that it has been confirmed that the difference in Young's modulus Ee of the cover and the difference in Young's modulus Ef of the glass portion hardly affect mode coupling in the few-mode fiber and hardly affect the change in $\Delta M^2$.

From these points, one may assume Formula (8) described below representing $\Delta M^2$ on the basis of the formula obtained by substituting Formula (7) described above into Formula (6) described above and eliminating $\Delta$.

$$\Delta M^2 = A \times NA^{-6} \times \left(a^4 / b^6\right) \times L \tag{8}$$

In Formula (8), A is a constant, and includes $n_1$, kg, Ee, and Ef as components. Note that the value of $n_1$ is 1.45 as described above. In addition, as described above, since Ee and Ef hardly affect the change in $\Delta M^2$, Ee and Ef can be regarded as constants.

Next, an optical fiber having a core diameter $2a$ of $28\times10^{-6}$m, a cladding diameter $2b$ of $320\times10^{-6}$m, a core numerical aperture NA of 0.071, and an entire length L of 26 m was prepared, and $\Delta M^2$ when light having a wavelength of 1070 nm was caused to propagate through the optical fiber was actually measured. As a result, the value of $\Delta M^2$ was 0.015. Hence, when the constant A was obtained by substituting a=$14\times10^{-6}$m, b=$160\times10^{-6}$m, NA=0.071, and L=26 m into Formula (8), the constant A was $3.24\times10^{-14}$. When the value of the constant A is substituted into Formula (8), Formula (9) described below is obtained.

$$\Delta M^2 = 3.24 \times 10^{-14} \times NA^6 \times \left(a^4 / b^6\right) \times L \tag{9}$$

Next, Samples 1 to 4 of an optical fiber indicated in Table 1 described below were prepared, and an actual measurement value of $\Delta M^2$ when the light having a wavelength of 1070 nm was caused to propagate through these Samples 1 to 4 was compared with an estimated value of $\Delta M^2$ calculated from Formula (9).

TABLE 1

|  | Sample 1 | Sample 2 | Sample 3 | Sample 4 |
|---|---|---|---|---|
| Core diameter 2a(m) | $36 \times 10^{-6}$ | $50 \times 10^{-6}$ | $50 \times 10^{-6}$ | $50 \times 10^{-6}$ |
| Cladding diameter 2b(m) | $320 \times 10^{-6}$ | $550 \times 10^{-6}$ | $600 \times 10^{-6}$ | $650 \times 10^{-6}$ |
| Numerical aperture NA | 0.082 | 0.082 | 0.082 | 0.082 |
| Length L(m) | 25 | 20 | 20 | 20 |

The results of this comparison are indicated in Table 2 below.

TABLE 2

|  | Actual measurement value | Estimated value |
|---|---|---|
| Sample 1 | 0.0163 | 0.0168 |
| Sample 2 | 0.0017 | 0.0019 |
| Sample 3 | 0.0012 | 0.0012 |
| Sample 4 | 0.0004 | 0.0007 |

As indicated in Table 2, the actual measurement value and the estimated value of each of Samples 1 to 4 were substantially the same. Thus, it was confirmed that $\Delta M^2$ of the optical fiber can be calculated on the basis of Formula (9).

In a general fiber laser device, the length of an optical fiber in a portion where light generated in a resonator is guided is approximately 40 m or less. In the fiber laser device 1 of one or more embodiments, the portion where light generated in the resonator is guided corresponds to a portion from the first FBG 35 to the output end 51. The light oscillated in the resonator and emitted from the fiber laser device includes light that reciprocates in the portion where the light generated in the resonator is guided. Therefore, the value of $M^2$ of the light emitted from the fiber laser device tends to be larger than the value of $M^2$ in a case where the light propagates only 40 m one way and is emitted without reciprocating in the aforementioned portion. However, when the value of $\Delta M^2$ of the light propagated one way is 0.1 or less, the value of $M^2$ of the light emitted from the fiber laser device can be approximately 1.5. When the value of $M^2$ of the emitted light is approximately 1.5, performance required in a normal fiber laser device can be satisfied. Hence, Formula (3) described above was obtained by substituting L=40 m and $\Delta M^2$ 0.1 into Formula (9).

When the radius a of the core, the radius b of the cladding, and the numerical aperture NA are adjusted so as to satisfy Formula (3), the value of $\Delta M^2$ of the light having a wavelength of 1070 nm after propagating 40 m through the core can be 0.1 or less, and deterioration of beam quality per unit length of 1 m can be 0.0025 or less. Thus, deterioration of the beam quality can be suppressed to such an extent that the value of $M^2$ of the light emitted from the fiber laser device does not exceed 1.5.

In addition, as described above, the amplification optical fiber 10 and the delivery fiber 40 of the fiber laser device 1 are configured to satisfy Formula (5) described above. With such a configuration, in a case where the bending radius R of the bent portion of each of the amplification optical fiber 10 and the delivery fiber 40 is 100 times or more the radius b of the cladding, light of LP03 mode can be cut off, and deterioration of the beam quality can be suppressed. This point will be described below.

In a fiber laser device, generally, there is a fusion-spliced portion between optical fibers, such as a fusion-spliced portion between an amplification optical fiber and a delivery fiber. Note that examples of the fusion-spliced portion in one or more embodiments include the fusion-spliced portion FP1 and the fusion-spliced portion FP2 described above. In such a fusion-spliced portion, even when there is no axial deviation or angular deviation between the optical fibers, the light of the fundamental mode tends to be coupled to an axisymmetric higher-order mode such as the LP03 mode. Therefore, in the fiber laser device, there is a demand for bending the optical fiber with a predetermined bending radius to remove an axisymmetric higher-order mode. Note that, in the fiber laser device, generally, from the viewpoint of reducing the probability of breakage of the optical fiber or the like, the percentage of the radius b(m) of the cladding to the bending radius R(m) of the optical fiber may be 2% or less. Such a bending radius R corresponds to a bending radius of 50 times or more the radius b of the cladding.

Non Patent Literature 3 (R. T. Schermer, "Mode scalability in bent optical fibers," Optics Express, vol. 15, no. 24, p. 15674, November 2007.) describes that a normalized propagation constant $B_R$ when an optical fiber is bent with a predetermined bending radius R is expressed by Formula (10) described below.

$$B_R = \begin{cases} Bs - (2V/\zeta)(\zeta > \zeta_{trans}) \\ Bs - \{(1 - Bs)/Bs\} \times \\ \left[1 + \{(\zeta_{trans}/\zeta) - 1\}^{2/3} - (\zeta_{trans}/\zeta) \times (1 - Bs)\right](\zeta < \zeta_{trans}) \end{cases} \quad (10)$$

$$\zeta = 1.27 \times R \times k_{clad} \times (NA/n_2)^2$$

$$\zeta_{trans} = 2V/Bs$$

Note that, in Formula (10), $k_{clad}$ is a wavenumber of the cladding, $n_2$ is a refractive index of the cladding, and $B_s$ is a normalized propagation constant in a straight state in which the optical fiber is not bent. In addition, V in Formula (10) means the above-described V value, and can be calculated from Formula (4) described above.

Here, the normalized propagation constant $B_s$ in the straight state can be obtained by actual measurement from the radius a(m) of the core and the relative refractive index difference $\Delta$ between the core and the cladding for each mode of light propagating through the core. When the normalized propagation constant $B_R$ is zero, the mode cannot be guided in the core but is cut off. Hence, the V value was changed on the basis of a formula obtained by substituting the value of $B_s$ of the light of LP03 mode obtained by actual measurement into Formula (10), and the change in the value of $B_R$ with respect to the bending radius R of the optical fiber was calculated. Thereafter, the range of the V value when the value of $B_R$ becomes zero with the bending radius R at which the aforementioned percentage becomes 1% or less when the radius of the cladding is b(m) was obtained, and Formula (5) described above was obtained. Thus, when the optical fiber is formed so as to satisfy Formula (5), the light of LP03 mode having a wavelength of 1070 nm can be cut off when the optical fiber is bent with the bending radius R of 100 times or more the radius b of the cladding.

Incidentally, when the optical fiber having a cladding radius of 325 μm disclosed in Non Patent Literature 1 described above is bent at a bending diameter of 350 mm in which the percentage of the cladding radius to the bending radius of the optical fiber is 0.09%, the light of LP01 mode is lost as much as about 10 dB/m, and thus such bending of the optical fiber is not allowed. The optical fiber of one or more embodiments was bent under the same conditions as those described in Non Patent Literature 1, and studied the loss of the light of LP01 mode propagating through the core of the optical fiber. As a result, the loss of the light of LP01 mode propagating through the optical fiber of one or more embodiments was approximately 0.001 dB/m. The loss of the light of 0.001 dB/m is extremely small as compared with the loss of the light of 10 dB/m in the optical fiber of Non Patent Literature 1. Therefore, with the optical fiber of one or more embodiments, the aforementioned bending that is not allowed in Non Patent Literature 1 is allowed.

In addition, as described above, the amplification optical fiber 10, the optical fiber 30, and the delivery fiber 40 of the fiber laser device 1 are configured such that the effective area $A_{eff}$ of the fundamental mode of light having a wavelength of 1070 nm is 500 $\mu m^2$ or more. When the effective area $A_{eff}$ is 500 $\mu m^2$ or more, stimulated Raman scattering tends to be less likely to occur. Therefore, with the fiber laser device 1, it is possible to suppress the occurrence of stimulated Raman scattering in the amplification optical fiber 10, the optical fiber 30, and the delivery fiber 40.

Figure 3:
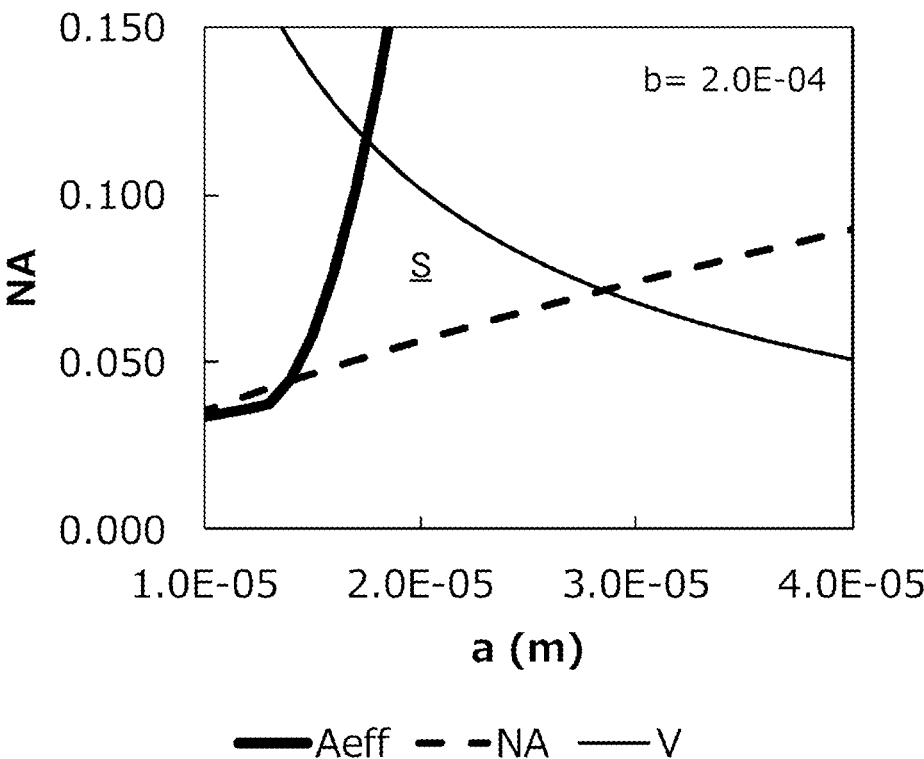
FIG. 3 is a diagram illustrating a parameter range for constituting the optical fiber according to one or more embodiments in a case where the radius of the cladding is $2.0 \times 10^{-4}$(m).
Figure 4:
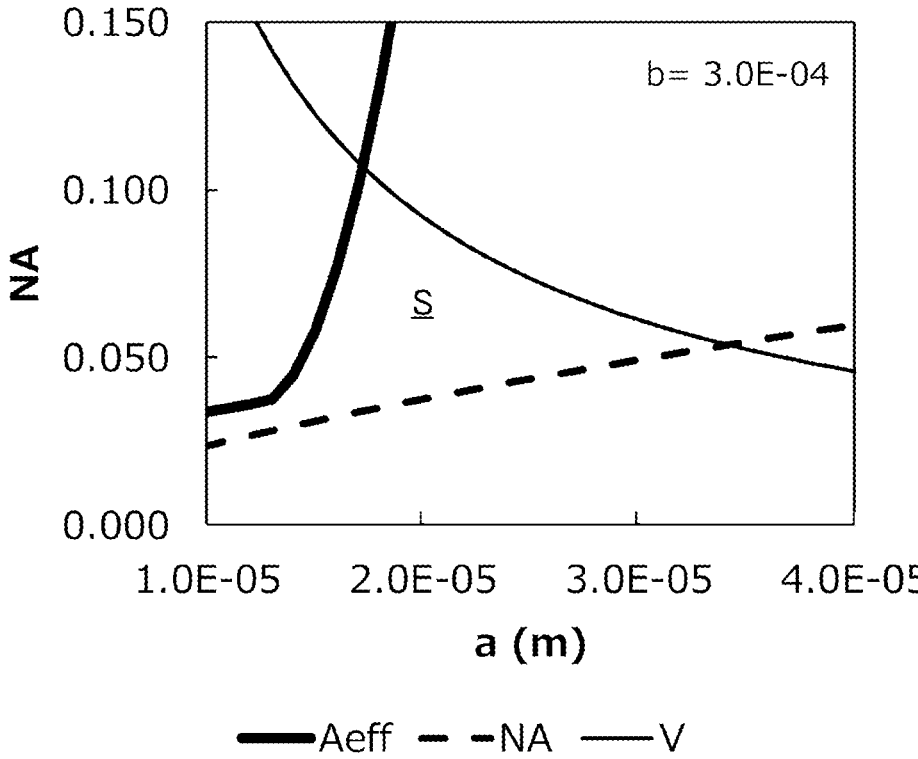
FIG. 4 is a diagram illustrating a parameter range for constituting the optical fiber according to one or more embodiments in a case where the radius of the cladding is $3.0 \times 10^{-4}$(m).
Figure 5:
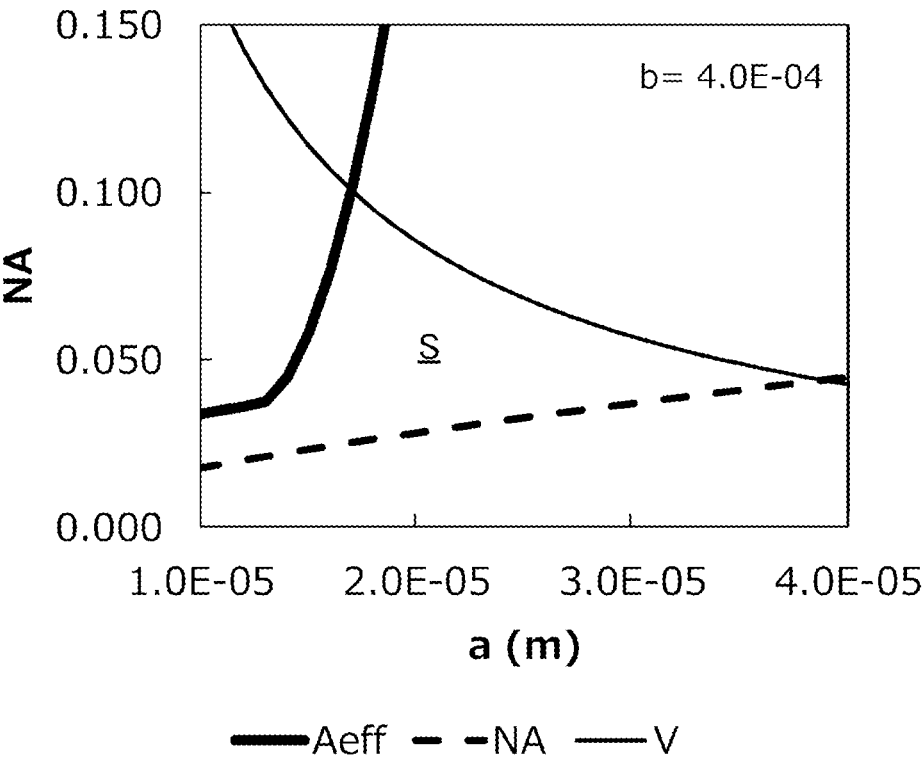
FIG. 5 is a diagram illustrating a parameter range for constituting the optical fiber according to one or more embodiments in a case where the radius of the cladding is $4.0 \times 10^{-4}$(m).

Incidentally, when the radius b of the cladding is a constant, Formulae (3) and (5) and the effective rea $A_{eff}$ can be expressed by a coordinate system in which the horizontal axis is the radius a(m) of the core and the vertical axis is the numerical aperture NA of the core. FIGS. 3 to 5 illustrate Formulae (3) and (5) and $A_{eff}$ in a case where the radius b(m) of the cladding is $2.0 \times 10^{-4}$, $3.0 \times 10^{-4}$, and $4.0 \times 10^{-4}$. In each of FIGS. 3 to 5, the thick line indicates the relationship between the radius a(m) of the core and the numerical aperture NA with $A_{eff}$=500 $\mu m^2$, the thin line indicates the relationship between the radius a(m) of the core and the numerical aperture NA in the case of the left-hand side=the right-hand side in Formula (5), and the broken line indicates the relationship between the radius a(m) of the core and the numerical aperture NA in the case of the left-hand side=the right-hand side in Formula (3). A range satisfying Formulae (3) and (5) and the effective area $A_{eff}$ 500 $\mu m^2$ is expressed by a region S surrounded by the thick line, the thin line, and the broken line.

Figure 6:
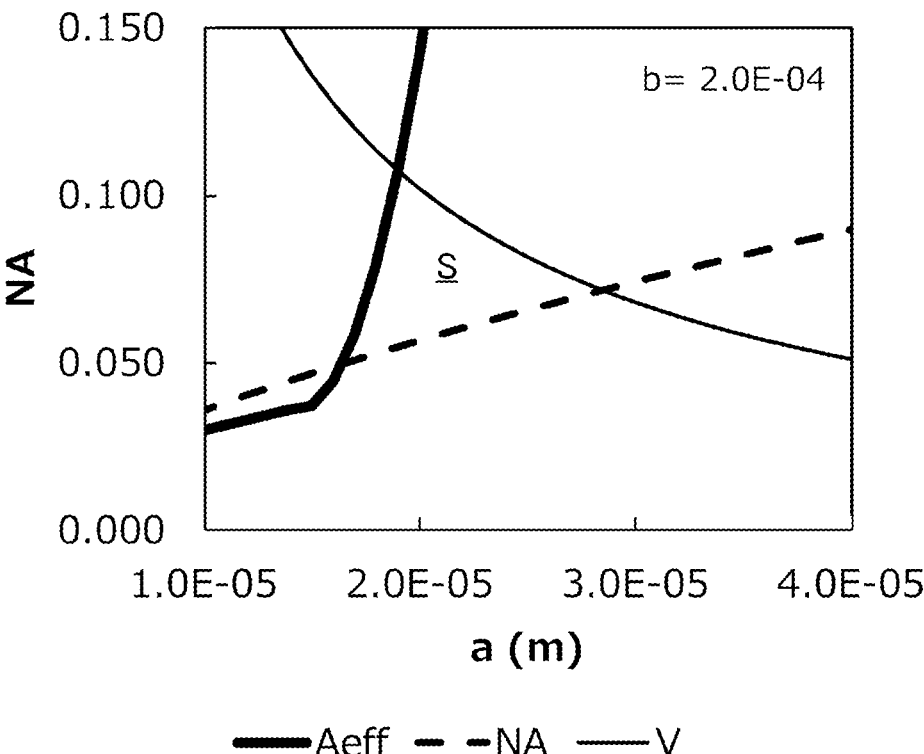
FIG. 6 is a diagram illustrating a parameter range for constituting an optical fiber having an effective area $A_{eff}$ of 600 μm² or more in a case where the radius of the cladding is $2.0 \times 10^{-4}$(m).
Figure 7:
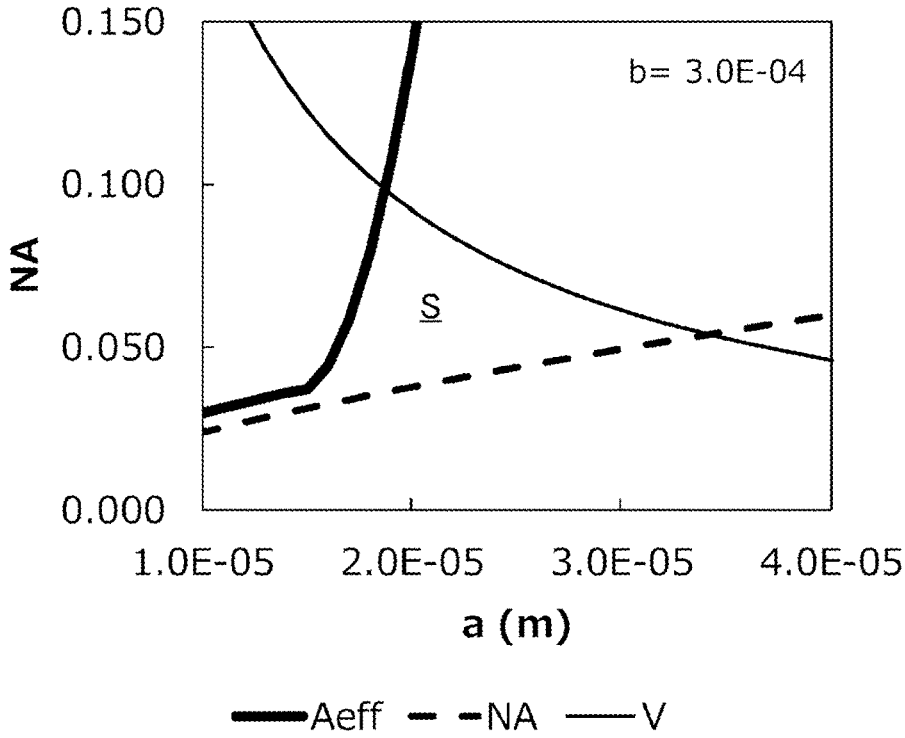
FIG. 7 is a diagram illustrating a parameter range for constituting an optical fiber having an effective area $A_{eff}$ of 600 μm² or more in a case where the radius of the cladding is $3.0 \times 10^{-4}$(m).
Figure 8:
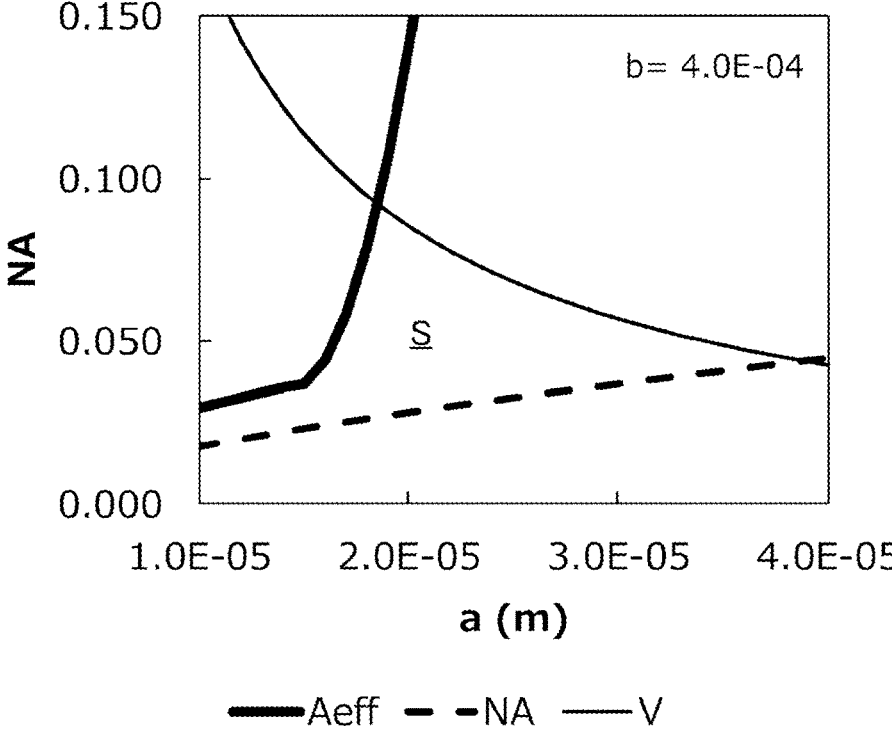
FIG. 8 is a diagram illustrating a parameter range for constituting an optical fiber having an effective area $A_{eff}$ of 600 μm² or more in a case where the radius of the cladding is $4.0 \times 10^{-4}$(m).

Note that the effective area $A_{eff}$ may be 600 $\mu m^2$ or more. In this case, stimulated Raman scattering can be suppressed as compared with a case where the effective area $A_{eff}$ is 500 $\mu m^2$ or more and less than 600 $\mu m^2$. FIGS. 6 to 8 illustrate Formulae (3) and (5) and $A_{eff}$ in a case where the radius b(m) of the cladding is $2.0 \times 10^{-4}$, $3.0 \times 10^{-4}$, and $4.0 \times 10^{-4}$. In each of FIGS. 6 to 8, the thick line indicates the relationship between the radius a(m) of the core and the numerical aperture NA with $A_{eff}$=600 $\mu m^2$, the thin line indicates the relationship between the radius a(m) of the core and the numerical aperture NA in the case of the left-hand side=the right-hand side in Formula (5), and the broken line indicates the relationship between the radius a(m) of the core and the numerical aperture NA in the case of the left-hand side=the right-hand side in Formula (3). A range satisfying Formulae (3) and (5) and the effective area $A_{eff} \geq 600$ $\mu m^2$ is expressed by a region S surrounded by the thick line, the thin line, and the broken line.

Figure 9:
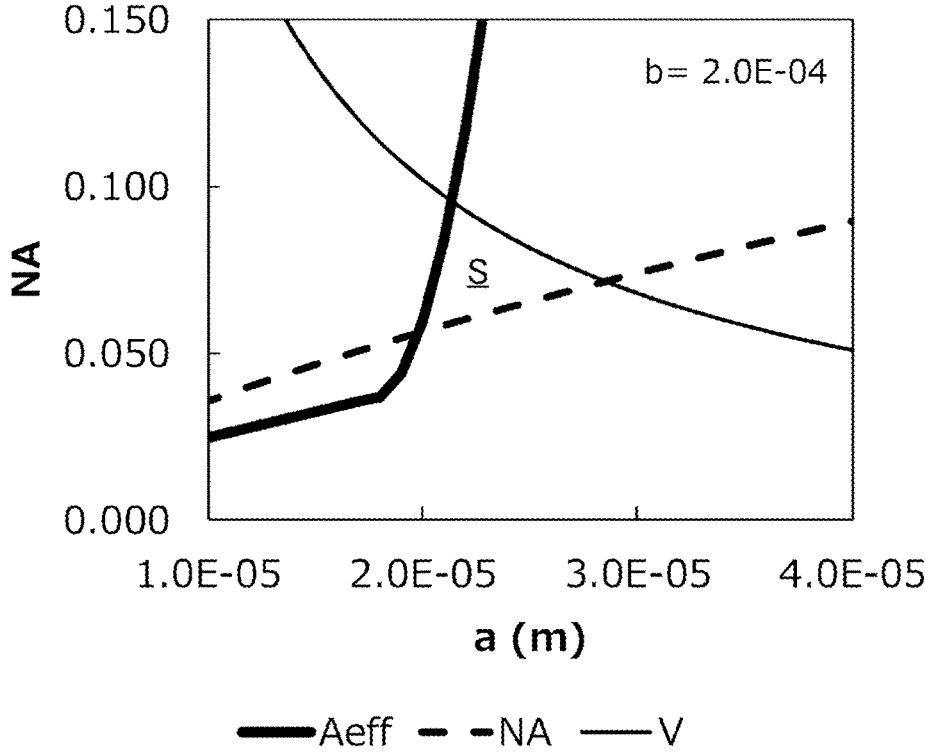
FIG. 9 is a diagram illustrating a parameter range for constituting an optical fiber having an effective area $A_{eff}$ of 800 μm² or more in a case where the radius of the cladding is $2.0 \times 10^{-4}$ (m).
Figure 10:
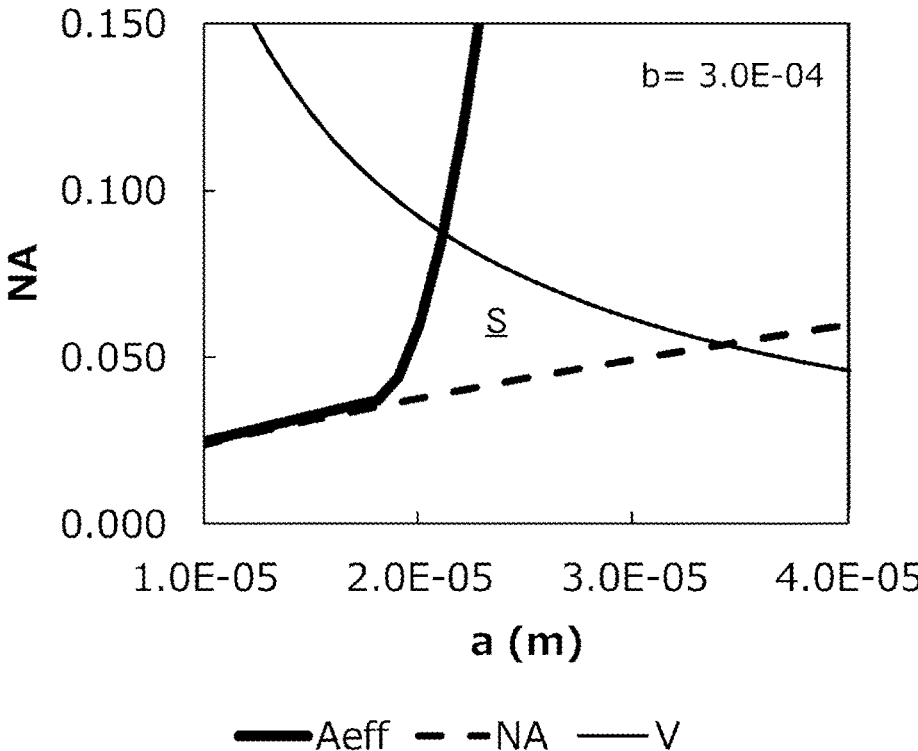
FIG. 10 is a diagram illustrating a parameter range for constituting an optical fiber having an effective area $A_{eff}$ of 800 μm² or more in a case where the radius of the cladding is $3.0 \times 10^{-4}$ (m).
Figure 11:
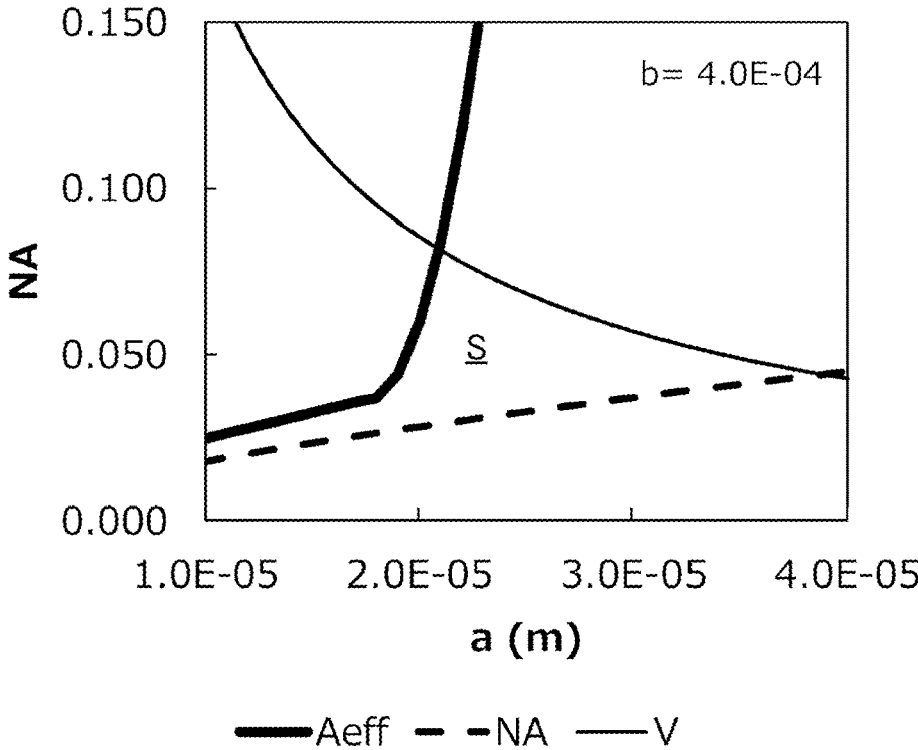
FIG. 11 is a diagram illustrating a parameter range for constituting an optical fiber having an effective area $A_{eff}$ of 800 μm² or more in a case where the radius of the cladding is $4.0 \times 10^{-4}$ (m).

In addition, the effective area $A_{eff}$ may be 800 $\mu m^2$ or more. In this case, stimulated Raman scattering can be suppressed as compared with a case where the effective area $A_{eff}$ is 600 $\mu m^2$ or more and less than 800 $\mu m^2$. FIGS. 9 to 11 illustrate Formulae (3) and (5) and $A_{eff}$ in a case where the radius b(m) of the cladding is $2.0 \times 10^{-4}$, $3.0 \times 10^{-4}$, and $4.0 \times 10^{-4}$. In each of FIGS. 9 to 11, the thick line indicates the relationship between the radius a(m) of the core and the numerical aperture NA with $A_{eff}$=800 $\mu m^2$, the thin line indicates the relationship between the radius a(m) of the core and the numerical aperture NA in the case of the left-hand side=the right-hand side in Formula (5), and the broken line indicates the relationship between the radius a(m) of the core and the numerical aperture NA in the case of the left-hand side=the right-hand side in Formula (3). A range satisfying Formulae (3) and (5) and the effective area $A_{eff} \geq 800$ $\mu m^2$ is expressed by a region S surrounded by the thick line, the thin line, and the broken line.

According to one or more embodiments, the light of LP03 mode is cut off and the light of LP01 mode propagates through the core by bending the optical fiber so as to satisfy the range of the region S illustrated in FIGS. 3 to 11.

In addition, the V value may satisfy Formula (11) described below.

$$V \leq 1.6509 \times b^{-0.1992} \tag{11}$$

Formula (11) expresses a range of the V value in which the light of LP02 mode having a wavelength of 1070 nm is cut off when the optical fiber is bent with a bending radius R(m) at which the percentage of the radius b of the cladding to the bending radius of the optical fiber is 1% or less. Thus, by satisfying Formula (11), the light of LP02 mode can be further cut off in addition to the light of LP03 mode. Accordingly, by satisfying Formula (11), the beam quality can be further improved.

Figure 12:
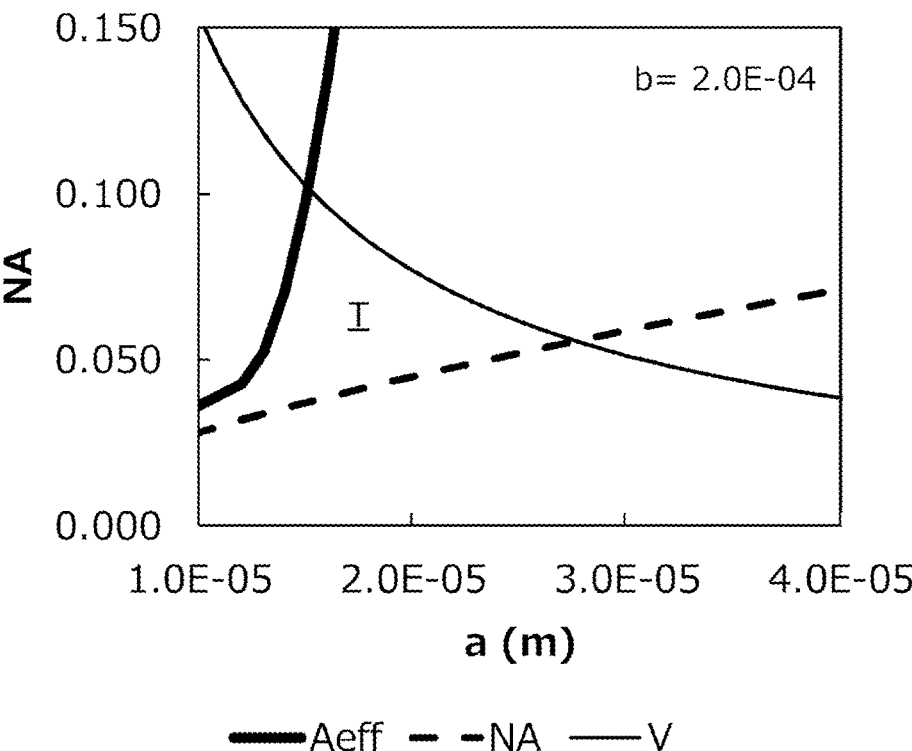
FIG. 12 is a diagram illustrating a parameter range for constituting an optical fiber having an effective area $A_{eff}$ of 500 μm² or more in a case where the range of a V value is changed from that in one or more embodiments and the radius of the cladding is $2.0 \times 10^{-4}$ (m).
Figure 13:
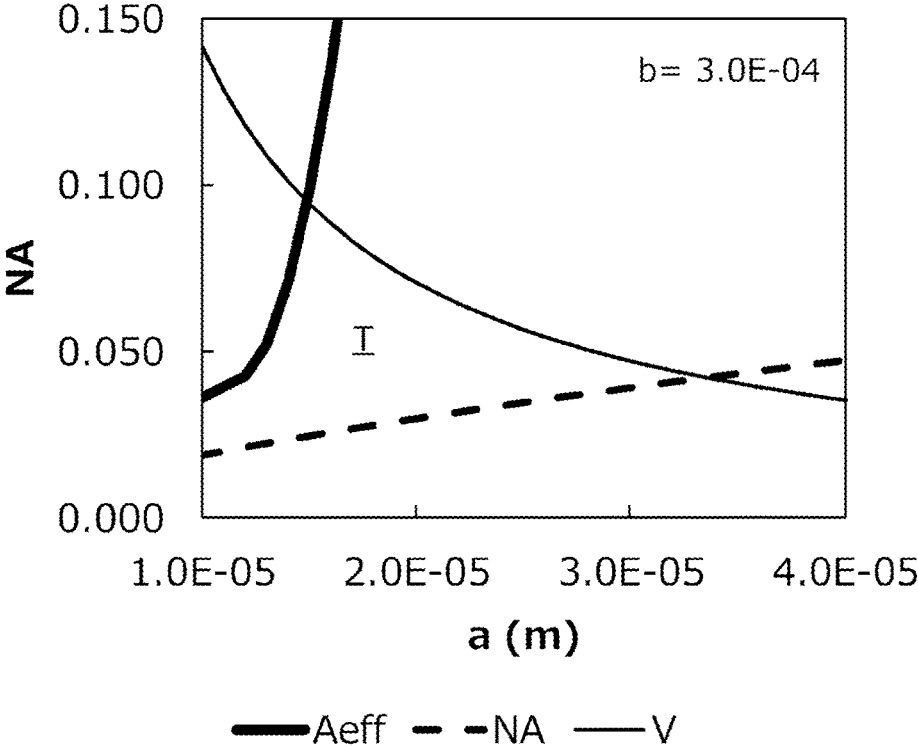
FIG. 13 is a diagram illustrating a parameter range for constituting an optical fiber having an effective area $A_{eff}$ of 500 μm² or more in a case where the range of a V value is changed from that in one or more embodiments and the radius of the cladding is $3.0 \times 10^{-4}$ (m).
Figure 14:
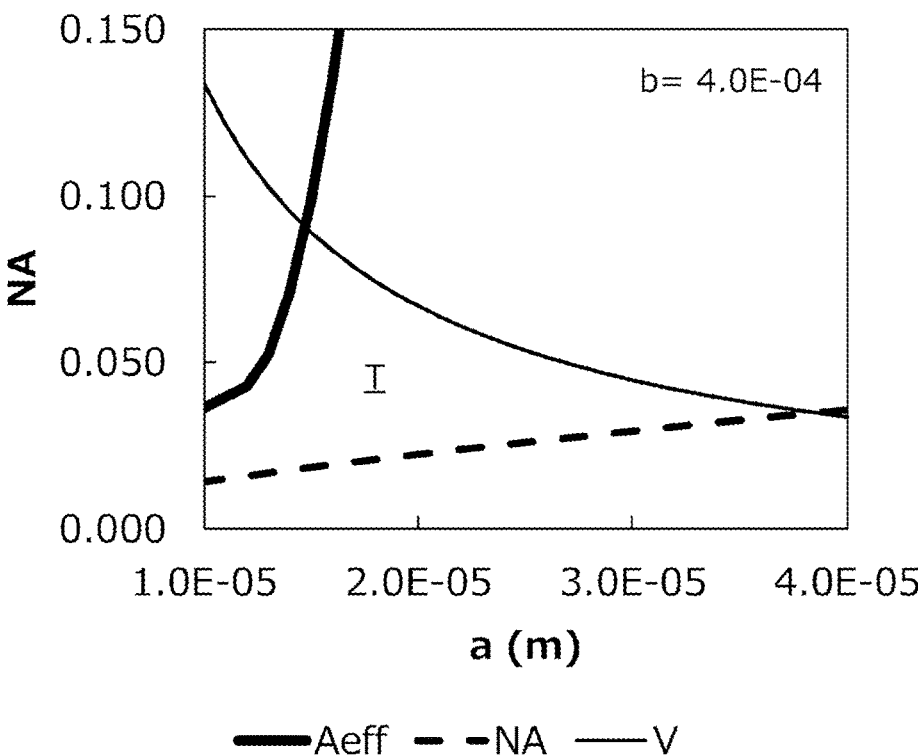
FIG. 14 is a diagram illustrating a parameter range for constituting an optical fiber having an effective $A_{eff}$ of 500 μm² or more in a case where the range of a V value is changed from that in one or more embodiments and the radius of the cladding is $4.0 \times 10^{-4}$ (m).

FIGS. 12 to 14 illustrate Formulae (3) and (11) and $A_{eff}$ in a case where the radius b(m) of the cladding is $2.0 \times 10^{-4}$, $3.0 \times 10^{-4}$, and $4.0 \times 10^{-4}$. In each of FIGS. 12 to 14, the thick line indicates the relationship between the radius a(m) of the core and the numerical aperture NA with $A_{eff}$=500 $\mu m^2$, the thin line indicates the relationship between the radius a(m) of the core and the numerical aperture NA in the case of the left-hand side=the right-hand side in Formula (11), and the broken line indicates the relationship between the radius a(m) of the core and the numerical aperture NA in the case of the left-hand side=the right-hand side in Formula (3). A range satisfying Formulae (3) and (11) and the effective area $A_{eff} \geq 500$ $\mu m^2$ is expressed by a region T surrounded by the thick line, the thin line, and the broken line.

With the fiber laser device 1 of one or more embodiments, the light of LP03 mode and the light of LP02 mode are cut off and the light of LP01 mode propagates through the core by bending the optical fiber so as to satisfy the range of the region T illustrated in FIGS. 12 to 14.

In addition, the numerical aperture NA of the core may be 0.05 or more. By configuring the optical fiber in this manner, mode coupling due to disturbance can be suppressed as compared with a case where the numerical aperture NA is smaller than 0.05.

Although the invention has been described above by taking the aforementioned embodiments as an example, the invention is not limited thereto.

For example, a bent portion that satisfies one of Formulae (5) and (11) may be provided in a portion of the optical fiber 30 on the amplification optical fiber 10 side with respect to the first FBG 35. In this way, the beam quality can be further improved.

In addition, the radius a of the core of the optical fiber 30, the amplification optical fiber 10, and the delivery fiber 40 may not be the same, the radius b of the cladding of the optical fiber 30, the amplification optical fiber 10, and the delivery fiber 40 may not be the same, the numerical aperture NA of the optical fiber 30, the amplification optical fiber 10, and the delivery fiber 40 may not be the same, and the effective area $A_{eff}$ of the optical fiber 30, the amplification optical fiber 10, and the delivery fiber 40 may not be the same.

In addition, the optical fiber configured to satisfy Formula (3), satisfy one of Formulae (5) and (11), and have an effective area $A_{eff}$ of 500 μm or more may be, for example, only the amplification optical fiber 10 or only the delivery fiber 40.

In addition, the configuration of the amplification optical fiber 10 is not limited to the embodiments described above. An element such as germanium (Ge) that increases the refractive index may be added to the core 11, and an element such as fluorine (F) that reduces the refractive index may be added to the cladding 12. In addition, the active element added to the core 11 is not limited to ytterbium, and may be another rare earth element. Examples of such a rare earth element include thulium (Tm), cerium (Ce), neodymium (Nd), europium (Eu), and erbium (Er). Furthermore, examples of the active element include bismuth (Bi) in addition to the rare earth element.

In addition, the configuration of the fiber laser device is not limited to the embodiments described above, and may be, for example, a MOPA fiber laser device.

Next, one or more embodiments described above will be described below more specifically with reference to examples and a comparative example, but the invention is not limited to the content described below.

First Example

This example was performed using the fiber laser device 1 having the same configuration as that of one or more embodiments described above. The core diameter 2a of the optical fiber 30, the amplification optical fiber 10, and the delivery fiber 40 of the fiber laser device 1 was 31 μm, the cladding diameter 2b was 400 μm, and the numerical aperture NA was 0.071. The optical fiber 30, the amplification optical fiber 10, and the delivery fiber 40 were formed so as to satisfy Formula (3). In addition, the effective area $A_{eff}$ of each of the optical fiber 30, the amplification optical fiber 10, and the delivery fiber 40 was 550 μm². In addition, a bent portion having a bending radius R of 20 mm was formed in a part of the amplification optical fiber 10 and the delivery fiber 40. The amplification optical fiber 10 and the delivery fiber 40 were formed so as to satisfy Formula (5). The fiber laser device 1 was used to oscillate light having a wavelength of 1070 nm, and the value of $M^2$ of laser light emitted from the output end 51 was measured and found to be 1.3. As described above, the value of $M^2$ in this example was smaller than 1.5.

Note that, in this example, no bent portion was formed in the optical fiber 30. Therefore, as in the amplification optical fiber 10 and the delivery fiber 40, by forming a bent portion in a portion of the optical fiber 30 on the amplification optical fiber 10 side with respect to the first FBG 35, the value of $M^2$ is considered to be closer to 1.

Second Example

This example was performed using the fiber laser device 1 having the same configuration as that of one or more embodiments described above. The core diameter 2a of the optical fiber 30, the amplification optical fiber 10, and the delivery fiber 40 of the fiber laser device 1 was 36 μm, the cladding diameter 2b was 400 μm, and the numerical aperture NA was 0.077. The optical fiber 30, the amplification optical fiber 10, and the delivery fiber 40 were formed so as to satisfy Formula (3). In addition, the effective area $A_{eff}$ of each of the optical fiber 30, the amplification optical fiber 10, and the delivery fiber 40 was 620 pmt. In addition, a bent portion having a bending radius R of 20 mm was formed in a part of the amplification optical fiber 10 and the delivery fiber 40. The amplification optical fiber 10 and the delivery fiber 40 were formed so as to satisfy Formula (5). The fiber laser device 1 was used to oscillate light having a wavelength of 1070 nm, and the value of $M^2$ of laser light emitted from the output end 51 was measured and found to be 1.4. As described above, the value of $M^2$ in this example was smaller than 1.5.

Note that, in this example, no bent portion was formed in the optical fiber 30. Therefore, as in the amplification optical fiber 10 and the delivery fiber 40, by forming a bent portion in a portion of the optical fiber 30 on the amplification optical fiber 10 side with respect to the first FBG 35, the value of $M^2$ is considered to be closer to 1.

Comparative Example

This example was performed using the fiber laser device 1 having the same configuration as that of one or more embodiments described above. The core diameter 2a of the optical fiber 30, the amplification optical fiber 10, and the delivery fiber 40 of the fiber laser device 1 was 55 μm, the cladding diameter 2b was 700 μm, and the numerical aperture NA was 0.082. A bent portion satisfying one of Formulae (5) and (11) was not provided in the optical fiber 30, the amplification optical fiber 10, and the delivery fiber 40 in this example. The fiber laser device 1 was used to oscillate light having a wavelength of 1070 nm, and the value of M2 of laser light emitted from the output end 51 was measured and found to be 1.9. As described above, the value of M2 in this example was larger than 1.5, and was larger than the values of M2 in the first and second examples.

As described above, in the comparative example that does not satisfy both Formulae (5) and (11), the value of M2 of the light having a wavelength of 1070 nm emitted from the fiber laser device is larger than 1.5, whereas in the first and second examples that satisfy Formulae (3) and (5), the value of M2 of the light is verified to be smaller than 1.5.

According to one or more embodiments, an optical fiber capable of suppressing deterioration of beam quality and occurrence of stimulated Raman scattering and allowing bending with a large curvature, and a fiber laser device including the optical fiber can be provided, and they can be used, for example, in the field of laser processing or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:
1. An optical fiber comprising:
a core of radius a (m); and
a cladding of radius of b (m), wherein
a numerical aperture NA of the core satisfies the following formula:

$$NA \geqq \left(1.3 \times 10^{-11} \times a^4 / b^6\right)^{1/6},$$

the optical fiber includes a bent portion that is bent with a bending radius that is 100 times or more of the radius b (m) such that:

a V value, that is a waveguide parameter of the optical fiber, satisfies the following formula:

$$V \leqq 1.3583 \times b^{-0.2555};$$

and a fundamental LP01 mode of 1070 nm light propagates through the core with a loss of 0.001 dB/m and an effective area $A_{eff}$ of 500 μm² or more, while propagation of an axisymmetric LP03 mode is cutoff.

2. The optical fiber according to claim 1, wherein the effective area $A_{eff}$ is 600 μm² or more.

3. The optical fiber according to claim 2, wherein the effective area $A_{eff}$ is 800 μm² or more.

4. The optical fiber according to claim 1, wherein the V value satisfies the following formula:

$$V \leqq 1.6509 \times b^{-0.1992}.$$

5. The optical fiber according to claim 1, wherein the numerical aperture NA is 0.05 or more.

6. A fiber laser device comprising the optical fiber according to claim 1.

7. The optical fiber according to claim 1, wherein a length of the optical fiber is greater than or equal to 20 meters and less than or equal to 40 meters.

* * * * *